J. F. PLACE.
APPARATUS FOR LIQUEFYING AIR.
APPLICATION FILED FEB. 14, 1916.

1,326,961.

Patented Jan. 6, 1920.
6 SHEETS—SHEET 1.

Fig. 1.

Attest—
Clarence Place
J. G. Gadsden.

Inventor
J. F. Place

J. F. PLACE.
APPARATUS FOR LIQUEFYING AIR.
APPLICATION FILED FEB. 14, 1916.

1,326,961.

Patented Jan. 6, 1920.
6 SHEETS—SHEET 4.

J. F. PLACE.
APPARATUS FOR LIQUEFYING AIR.
APPLICATION FILED FEB. 14, 1916.

1,326,961.

Patented Jan. 6, 1920.
6 SHEETS—SHEET 5.

UNITED STATES PATENT OFFICE.

JAMES F. PLACE, OF GLEN RIDGE, NEW JERSEY.

APPARATUS FOR LIQUEFYING AIR.

1,326,961.  Specification of Letters Patent.  Patented Jan. 6, 1920.

Application filed February 14, 1916. Serial No. 78,113.

*To all whom it may concern:*

Be it known that I, JAMES F. PLACE, a citizen of the United States, and resident of Glen Ridge, in the county of Essex and State of New Jersey, have invented certain new and useful Improvements in Apparatus for Liquefying Air, of which the following is a specification.

This invention relates to improvements in apparatus for liquefying air, and producing therefrom liquefied gases rich in oxygen.

The object of such improvements in said apparatus is to reduce the cost of production of such liquefied gases.

In order that those skilled in the art may understand and make use of my invention, I will describe my improved apparatus by the aid of the accompanying drawings, in which—

Referring to the above described drawings of my improved apparatus, similar reference marks refer to similar parts throughout the same. Taking the parts in order as named, at 1 I show an ordinary 4-stage belted air-compressor for compressing the high-pressure air to be expanded. This air is preferably compressed to a tension of about 201 atmospheres. At 2 I show a similar compressor, to compress alone the air to be liquefied. This air is compressed preferably to substantially near to or above the critical pressure of air, or to from 30 to 50 atmospheres. This latter compressor (2) is preferably built of less intake capacity than compressor (1). At 3 (Fig. 1) I show a water cooling drum, to remove the heat of compression from the air of high-tension, to be expanded. At 5 I show a chemical drying drum, charged with calcium chlorid in lump form, and at 6 a similar drum charged with caustic potash, slaked lime or caustic soda or some other substance which has a strong chemical affinity for carbon dioxid gas. I preferably use caustic potash as I have found it more effective for the purpose than anything else. The higher-pressure air compressed to about 201 atmospheres, is delivered to the water cooler 3, through pipe 7; and the air to be liquefied compressed to about 40 atmospheres, is delivered to the water cooler 4 through pipe 8; and from thence the higher-pressure air is delivered to the chemical drums 5 and 6, successively, through pipes 9 and 10; the air to be liquefied, of less compression, is delivered to its chemical drums, the calcium chlorid drum 11 and the caustic potash drum 12, successively, wherein is absorbed successively, most of the moisture which is absorbed by the calcium chlorid in drum 11, and all of the carbon dioxid gas in said air, which is taken up by the caustic potash in drum 12. This air to be liquefied is delivered to these drums (11 and 12) successively through the pipes 13 and 14.

The higher-pressure air to be expanded, supplied by compressor 1, and the less pressure air to be liquefied supplied by compressor 2, as described above are both now ready for further use in my improved apparatus—the former to be delivered from drum 6 through pipe 15, and the latter from drum 12 through pipe 16.

It will be noticed that in my apparatus, as herein described, I make use of air of two different pressures—one, the higher-pressure, being compressed to about 201 atmospheres, which is cooled by being expanded as released in successive drops in pressure of from 25 to 50 atmospheres at each drop or release, and is finally utilized to liquefy the other air which is compressed to a less tension, or to preferably from 30 to 50 atmospheres only. This feature in an apparatus for liquefying air by utilizing the "Joule-Thomson effect," so called, (or the production of a refrigerative effect by expanding air without external work, from a relatively high to a relatively low pressure, through a throttled valve) in contradistinction from mechanically expanding air in an engine with external work,—this special feature of using two separate and distinct portions of air, one of very high pressure for self-intensive cooling by expansion through a throttled valve, and one of very considerably less pressure, all of which is liquefied by the cooling effect of the other (after it has been expanded), is entirely original with me, being for the first time disclosed in my application for a process patent, Serial No. 25,345, now pending. This improved apparatus is for the purpose of and is specially for carrying out the aforesaid improved process.

Figure 7:
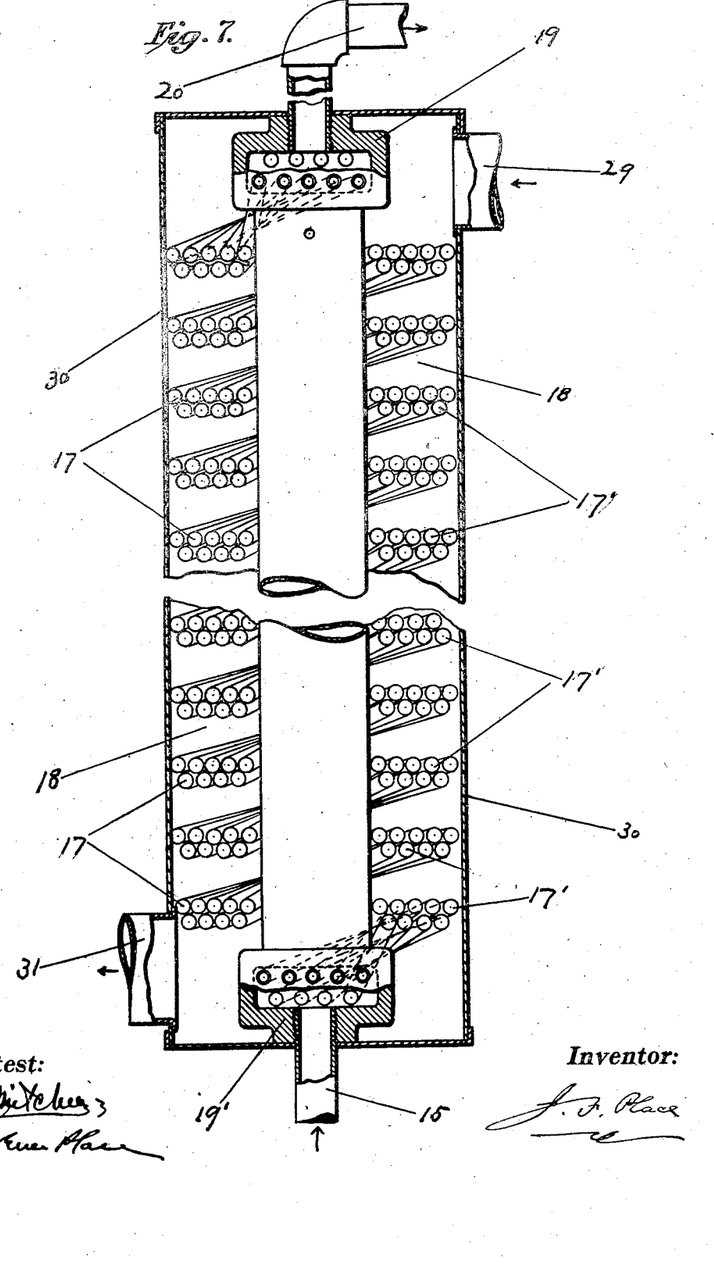
Figs. 7 and 8 are vertical sections, enlarged, showing the inside of inter-changer drum 30, shown in Fig. 2 and of the pre-cooling drum 45, shown in Fig. 3—the first to pre-cool the high-pressure air to be expanded, and the second to pre-cool the air to be liquefied.

At 17 (see Fig. 7) I have a nest or bunch of double helical coils, preferably made of 9 small seamless copper tubes in each coil, so that the helical passage 18 is maintained between the two helices 17 and 17' (of 9 coils of copper tubes each) through the whole length of the helical 9-tube coils, 17 and 17'. These coils (17 and 17') are preferably brazed into the bronze headers, 19 at the top and 19' at the bottom. They carry the supply of highly compressed air which is to be expanded by steps as hereinafter explained. To this latter header (19') at the bottom, is connected the high-pressure air-supply pipe 15 (see Fig. 1). The top header 19 is connected by pipe 20, with the first pressure-releasing or expansion valve 21 which delivers to the first expansion drum 22. I have preferably two other successive expansion drums, 22ᵃ and 22ᶜ, and other successive pressure-releasing valves, 21ᵃ, 21ᶜ and 21ˣ, although the number of both valves and drums may be increased to double or more than that number. Valve 21 delivers the air to and expands the same into drum 22; and valve 21ᵃ delivers the air to and expands the same into drum 22ᵃ and valve 21ᶜ delivers the air to and expands the same into drum 22ᶜ, while valve 21ˣ delivers the air to the chamber 23, released substantially to or near to atmospheric pressure. Preferably these expansion drums are made larger, as the volume of the repeatedly released air increases, as shown in the drawing Fig. 2.

Figure 2:
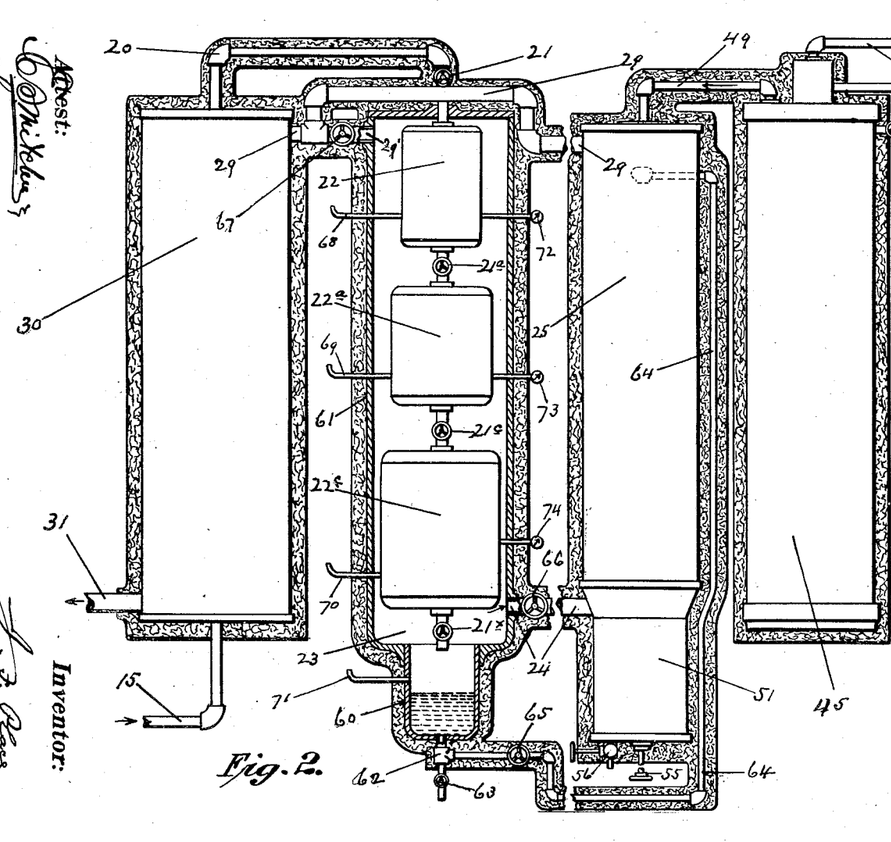
Fig. 2 is a view, partly in vertical section and partly in side elevation, of the apparatus I use for pre-cooling the high-pressure air after having the most of its moisture and all of its carbon dioxid gas removed therefrom, by that part of the improved apparatus shown in Fig. 1; and cooling said air by expansion through a series of successive pressure-reducing valves from a very high compression to finally substantially atmospheric pressure.
Figures 4, 9:
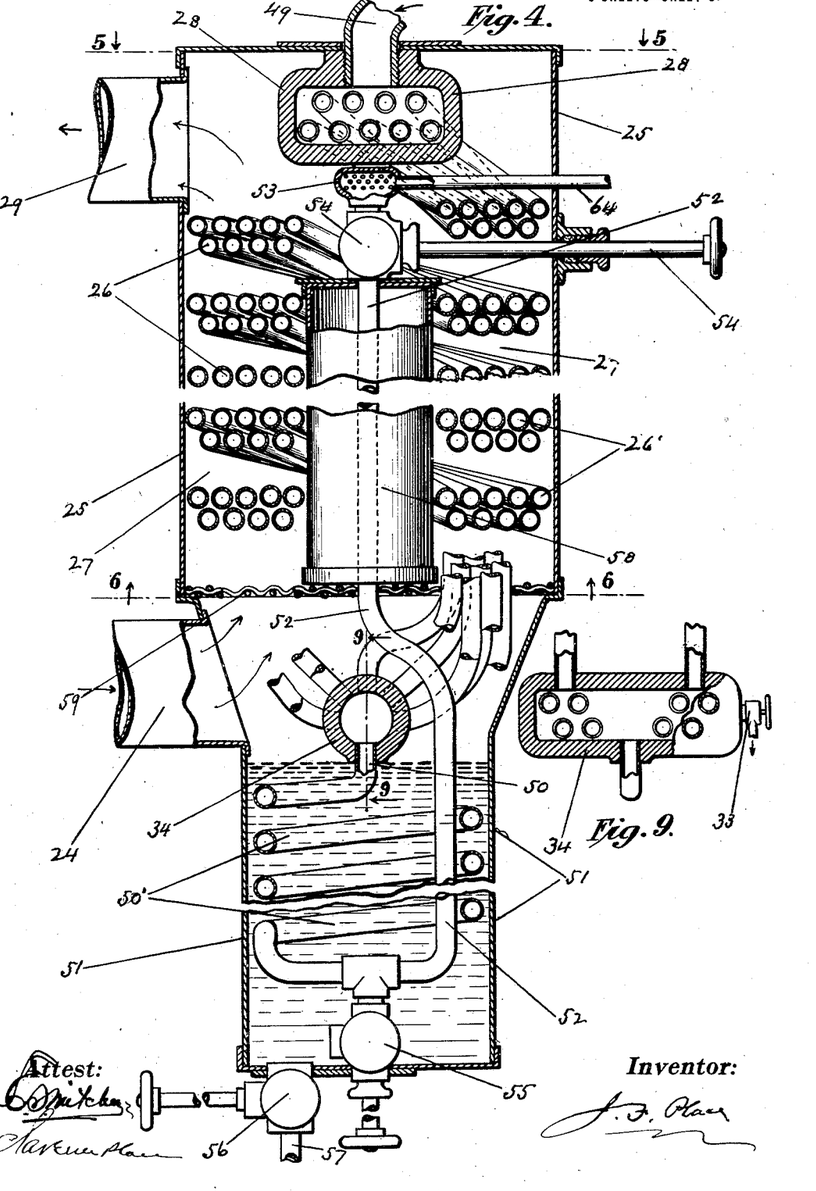
Fig. 4 is a diagrammatic view partly in vertical and partly in side elevation, of my improved air-liquefying and nitrogen vaporizing apparatus, as further on described herein, being inside view of details of drum 25 in Fig. 3.
Fig. 9 is a cross-section of the lower header in the liquefier.
Figure 5:
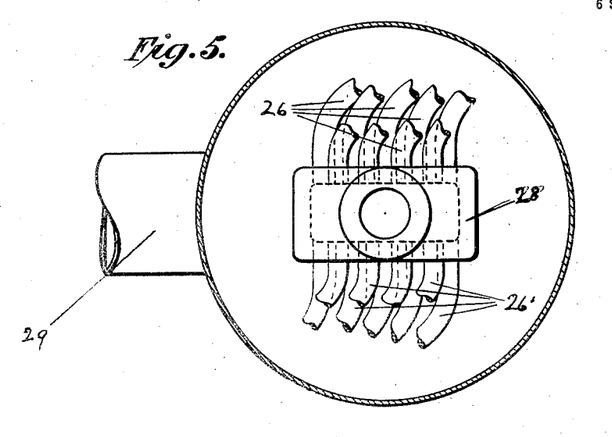
Fig. 5 is a plan view looking down upon the liquefying coils shown in Fig. 4.

At 24 I show an expanded air outlet tube, delivering from the chamber 23 to the low-pressure chamber of the liquefying drum 25 (see Fig. 4). Naturally this high-pressure air as repeatedly released from pressure through the expansion valves 21, 21ᵃ, 21ᶜ and 21ˣ, and successively expanded in drums 22, 22ᵃ and 22ᶜ, and in chamber 23, being subject to what is known as the "Joule-Thomson effect," it is cooled in accordance with the recognized formula $$\frac{p^1 - p^2}{4}\left(\frac{289}{T}\right)^2 = \text{the fall in temperature in centigrade degrees;}$$

wherein, $p^1$ is the initial pressure in atmospheres, $p^2$ the pressure in atmospheres after release, and T the initial absolute temperature of the air before expansion, in centigrade degrees. As explained farther on, under this formula, with an initial temperature of the air as it enters the first pressure-releasing valve (21) of —55° centigrade, this air as it leaves valve 21ᶜ and is expanded in the 3rd expansion drum (22ᶜ), it reaches its critical temperature, which is its temperature of liquefaction, for the pressure in drum 22ᶜ (if a drop in pressure as released from each valve is limited to 50 atmospheres), is still at 51 atmospheres (or 12 atmospheres above its critical pressure) provided its initial pressure, before entering the first pressure-releasing valve (21) was as intended, at an initial tension of 201 atmospheres. Therefore, there would be some liquefaction of the air in the 3rd drum, and very considerably more liquefaction as released from expansion valve 21ˣ into the chamber 23.

In Fig. 4 I show the liquefier of my improved apparatus, which consists of a double helical coil, each of the two helices consisting of nine seamless copper tubes 26 and 26' so coiled as to leave a helical passage 27 between the same.

The expanded and unliquefied air in chamber 23, is of same temperature as the liquefied portion, or at —191.4° centigrade. This cold expanded air passes from chamber 23, through the metal conduit 24 into the liquefying drum 25 below the liquefying coils 26 and 26', as shown in Fig. 4. The air to be liquefied in the coils 26 and 26' if at a tension at or above its critical pressure (39 atmospheres) liquefies at —140° centigrade, so that the cold expanded air is at a temperature of over 50 degrees centigrade colder than the liquefying temperature of the air in the coils 26 and 26'. If the quantity of the expanded air delivered from chamber 23 through the conduit 24, is sufficient, there can be but one result—all of the air in the liquefying coils 26 and 26' will become liquefied. Naturally the cold expanded air as it passes up through the helical passage 27, or up between the 18 coiled tubes, 26 and 26', becomes more or less re-heated.

This partially re-heated air cannot rise in temperature above the temperature of the air to be liquefied in the coils 26 and 26', as said air to be liquefied is admitted to said coils from the header 28 at top of the liquefier drum 25. (See Fig. 4.)

At 29, I have a conduit (which is practically a continuation of conduit 24) which delivers from the top of the liquefier drum 25 to the top of the thermal interchanger drum 30, which incloses the helical cooling coils 17 and 17', which carry the incoming supply of the high-pressure air to be expanded in the pressure-reducing valves 21, 21ª, 21ᶜ and 21ˣ (see Figs. 2 and 7), as heretofore explained. This partially re-heated expanded air, is still cold, near to the temperature of the air to be liquefied as it enters the header 28, which has been pre-cooled to a temperature of about —90° C. as will be hereinafter explained. Entering the drum 30 from conduit 29, it passes into the helical passage 18, and down the drum 30, and is further re-heated in cooling the highly compressed incoming air in the coils 17 and 17' until its temperature is practically normal. It then passes out through the conduit 31 at the bottom of the drum 30, and is re-delivered to the compressor 1 (see Fig. 1) and is re-compressed—thus being used over and over again in a closed circuit. The advantage of thus using this air in a closed-circuit, is that once the moisture and $CO_2$ gas have been absorbed therefrom by the chemical drums 5 and 6 (see Fig. 1), and has been expanded in the pressure-reducing valves, consecutively, as shown, it is entirely free of moisture and $CO_2$ gas— which saves much refrigeration which would be otherwise neutralized by the latent heat given out in condensing and freezing said moisture in the system.

Figure 1:
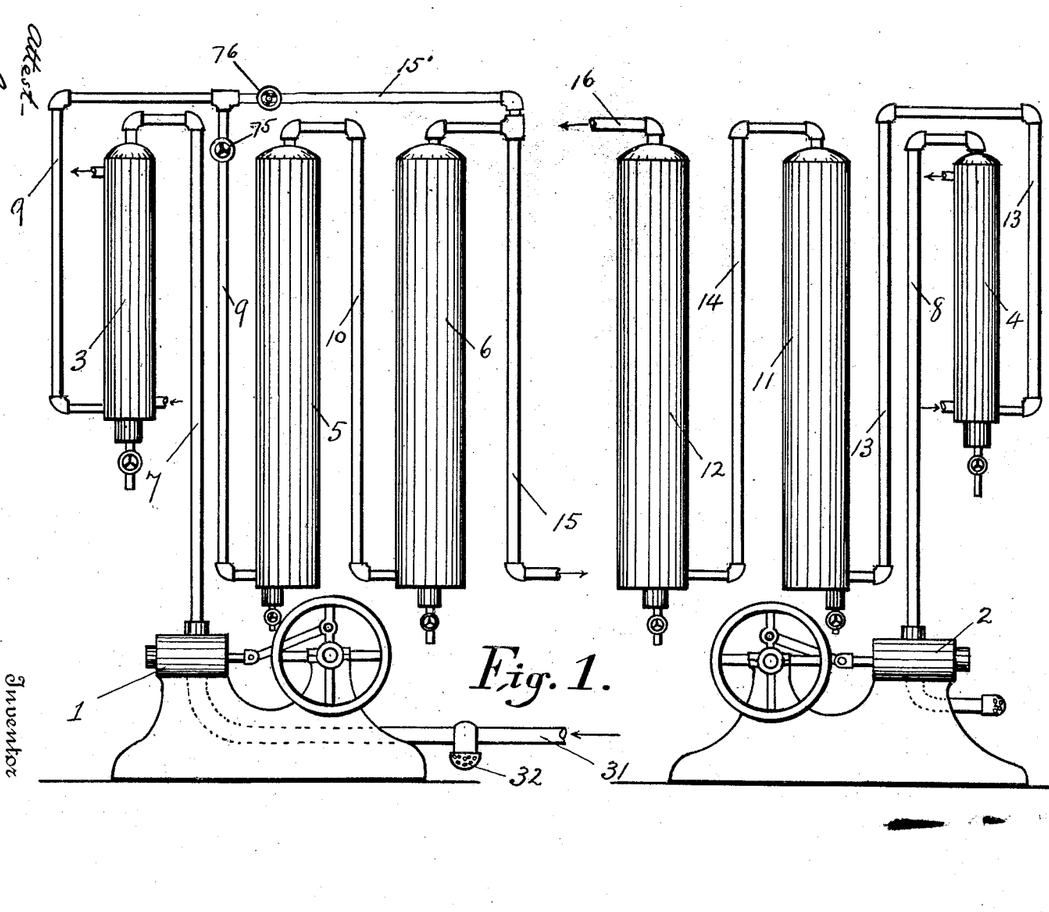
Figure 1 is a diagrammatic view in side elevation of the air compressors used in the improved apparatus, with water cooling drums for removing the heat of compression of the air treated; and the chemical drying drums for extracting moisture therefrom, as well as the other chemical drums, charged with caustic potash or other substance for absorbing from the air used all carbon dioxid gases ($CO_2$).

At 32 I show a check valve suction inlet head, for supplying the compressor (1) with air in starting up, and for making up any loss due to leakage, or liquefaction in chamber 23 (see Fig. 2). By opening valve 33 (see Fig. 9) any loss of the closed-circuit air may be also made good, by adding to said expanded air such portion of air already free of both moisture and $CO_2$ gas, from the header 34, and which is preferable to drawing in fresh outside air through the suction inlet head 32, to compensate for such leakage or loss.

It is well known to those skilled in the art of liquefying air, that regardless of the method or of the apparatus employed, it is vitally important to pre-cool the air to be liquefied. The production of low temperatures, however produced, requires the expenditure of energy; and in liquefying air, after removing from the air to be liquefied the heat of compression, moisture and carbon dioxid gas, nothing else is required except refrigeration—a low degree of refrigeration and a good deal of it. If air is liquefied without an appreciable amount of external work, under the "Joule-Thomson effect," when compressed to a high tension of from 150 to 200 atmospheres, and released to atmospheric or a relatively low pressure, only the small percentage of 7 to 9 per cent. is liquefied of the air treated, owing to the amount of friction generated, the small amount of work obtained, and the latent heat which has to be neutralized by the refrigerative effect produced; if liquefied mechanically in an air expansion engine cylinder, while the work is external and is far greater, the friction and latent heat both remain to keep the resultant liquefaction down to the minimum. The later and more successful practice is to expand the air in an engine cylinder, with regenerative cooling of the incoming supply of compressed air, until a temperature just at the point of liquefaction is reached in the exhaust air, and then to use that cold expanded air to liquefy other air while at a compression of substantially at or near to its critical pressure. That method has the positive advantage of liquefying the air when there is no latent heat of condensation, for when air is cooled to its critical temperature (—140° centigrade) while at or above its critical pressure (39 atmospheres, or 558.6 lbs. gage pressure), it is at what is called its critical juncture. At that point its density as a gas is exactly the same as its density as a liquid; and as there is neither expansion nor contraction involved under those conditions in its change of state from a liquid to a gas or from a gas to a liquid, there can be no latent heat, either required in the one case or given out in the other. The latent heat of air (at atmospheric pressure) is from 123 to 136 British thermal units per pound.

Figure 3:
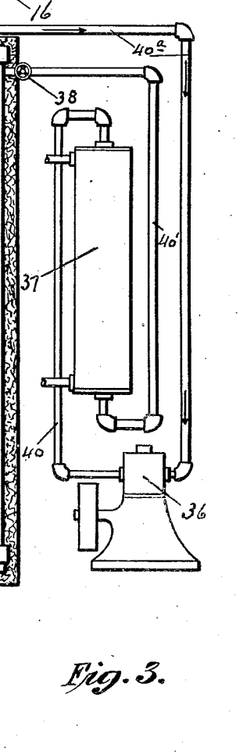
Fig. 3 is a diagrammatic view, partly in vertical section and partly in side elevation, of that part of my improved apparatus used for pre-cooling the air to be liquefied, which air is ordinarily compressed to a considerably less compression than the air consecutively expanded, and is preferably pre-cooled by releasing liquefied nitrous oxid ($N_2O$) from a relatively high to a relatively low tension.
Figure 8:
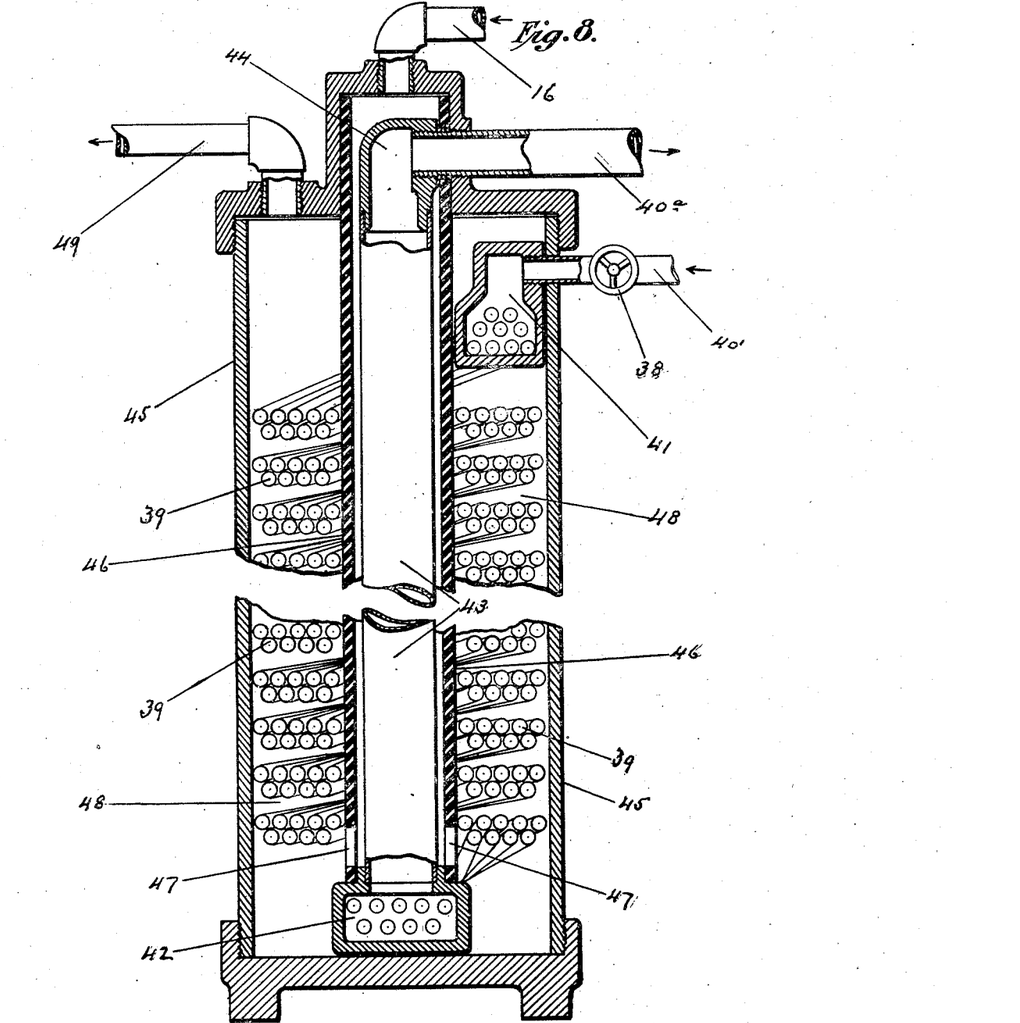

By my improved apparatus shown in Figs. 3, 4 and 8 the air to be liquefied (compressed to a tension at or above its critical pressure), after its heat of compression, a large portion of its moisture and the carbon dioxid gas contained therein have been removed by the apparatus shown in Fig. 1, it is then delivered through pipe 16 (see Figs. 1, 3 and 8) to the $N_2O$ pre-cooling drum 45, wherein it is pre-cooled to or about —90° C. This pre-cooling apparatus, consists of a small 3-stage gas compressor 36 (see Fig. 3) having a water-cooling condenser 37, with an expansion valve 38, and a series of small double helical coils 39 (see Fig. 8); these latter are made of copper tubing, and are bunched, 9 tubes in each coil. The gas is used in a closed-circuit compressed to about 70 atmospheres in the compressor 36, delivered through pipe 40 to the condenser 37, and the liquefied gas forced through pipe 40' to the expansion valve 38, and therein released to such reduced tension as desired into the header 41, (in the drum 45, see Figs. 3 and 8) in order to maintain such pre-determined temperature or boiling point of the released liquid in the vaporizing coils 39, as may be thought desirable. At 42 I show a header, (see Fig. 8) to which is connected all of the tubes forming the vaporizing coils 39, and this header (42) delivers to the upright conduit 43, at the lower end, which in turn delivers to the header 44 at the upper end, to which is connected the return flow gas pipe $40^a$ which delivers to the suction of the compressor (36). See Fig. 3.

The air to be pre-cooled and liquefied is delivered to the pre-cooling drum 45, at the top from the pipe 16 (see Figs. 3 and 8). This air preferably compressed to about 40 atmospheres, passes down through the insulating fiber conduit 46 (which surrounds the upright tube 43) in a counter-current to the return flow of the cold gases in the upright tube 43. This partially cooled compressed air then passes through the oblong holes 47, in and near the lower end of the tube (46), into the helical passage 48 (between the helical coils 39), and up through said helical passage (in counter-current to the descending liquefied gas evaporating in the helical coils 39), and thence out of the pre-cooling drum 45, through pipe 49, into the header 28 in the liquefying drum 25 (see Fig. 4).

The most economical method of producing a refrigerative effect, or which lowers the temperature with the least expenditure of energy, is that method employed by all of the great cold-storage plants; and that is by compressing a gas of relatively high-critical pressure and critical temperature, condensing the same while compressed, by water, and then releasing it from pressure, and utilizing the latent heat it requires for vaporization, by causing this liquefied gas as it vaporizes to take up that latent heat of vaporization which it requires, from its environments. This is the system employed by the modern cold-storage plant. Ammonia is mostly used. But the boiling point of ammonia at atmospheric pressure is only about —33° centigrade, and we need a lower temperature than that. With carbon dioxid gas ($CO_2$) I have obtained as low as —60° centigrade; much lower than that cannot in practice be attained, with this gas, for when it is liquefied it has the peculiar property when released from pressure of crystallizing into $CO_2$ snow. Nitrous oxid ($N_2O$) in its physical constants is very similar to $CO_2$, its critical temperature being 37° C., and its critical pressure about 73 atmospheres; but it does not have that above peculiar property, for its boiling or liquefying point at atmospheric pressure, or vaporizing point when as a liquefied gas it is released from the high tension under which it was condensed from a gas to such liquefied gas, to atmospheric pressure (to which temperature it drops as released), is at nearly —90° centigrade; and its freezing or solidifying temperature is about 13 degrees centigrade below that temperature, so that in its use for pre-cooling there is no danger of solidification. For this reason I give the preference to the use of $N_2O$ in the compressor 36 and evaporating coils 39 in my improved apparatus for pre-cooling the compressed air to be liquefied.

I may add in order to show clearly the great advantage of pre-cooling the air to be liquefied, that such air when at or above a tension of 39 atmospheres (its critical pressure) it liquefies at —140° centigrade. Taking the normal initial temperature (before pre-cooling) at say 15° centigrade, then that means to attain liquefaction, a fall in temperature is required of 155 degrees centigrade. With nitrous oxid, as I have shown, by releasing the $N_2O$ liquefied gas from the valve 38 (see Figs. 3 and 8) into the header 41 and evaporating coils 39, (see Fig. 8) to atmospheric pressure, the air to be liquefied, at a compression of about 40 atmospheres, as it passes through the drum 45, can be pre-cooled to —90° centigrade. This is a drop in temperature of the air to be liquefied of about 105 degrees centigrade, which is more than two-thirds of the total refrigeration required in order to liquefy the air. This makes for the greatest possible efficiency of the apparatus; from the cold expanded air delivered from chamber 23 through conduit 24 to the liquefier drum 25 (see Figs. 2 and 4), is relieved of more than two-thirds of the refrigerative effect required of it in order to liquefy all of the compressed air delivered to the liquefying coils 26 and 26' (see Fig. 4) from the pre-cooling drum 45 through connecting pipe 49.

By my improved apparatus as described herein, while I avail of the "Joule-Thomson effect", the accepted formula for which I have given, yet I am able with my apparatus to produce a much greater fall of temperature than is ordinarily obtained by that system. To illustrate, suppose we have air to be expanded compressed to a tension of 201 atmospheres, which is the compression I use in my apparatus. Now after regeneratively cooling the incoming supply, say to —55° centigrade, with one drop in pressure from 201 atmospheres to 1 atmosphere the Joule-Thomson formula gives us the following result:

$$\frac{201-1}{4} = 50 \times \left(\frac{289}{218}\right)^2 = \text{a fall in temperature of 87.873 degrees centigrade.}$$

Now, in my improved apparatus, if we release the highly compressed air by steps of 50 atmospheres at a time, say, or drop from 201 to 151 atmospheres in passing through valve 21 (see Fig. 2) and from 151 to 101 atmospheres in passing through valve 21$^a$, and from 101 to 51 atmospheres in passing through valve 21$^c$, and from 51 to 1 atmosphere in passing through valve 21$^x$, we will with the same Joule-Thomson formula, get the following results:

1st step—

$$\frac{201-151}{4} \times \left(\frac{289}{218}\right)^2 = \text{a fall of 21.968 degrees centigrade.}$$

2nd step—

$$\frac{151-101}{4} \times \left(\frac{289}{196}\right)^2 = \text{a fall of 27.168 degrees centigrade.}$$

3rd step—

$$\frac{101-51}{4} \times \left(\frac{289}{168.8}\right)^2 = \text{a fall of 36.89 degrees C.}$$

In this 3rd step, deducting the fall of 36.89 degrees from the initial absolute temperature used in this step, 168.8°, and we get 131.99° C. absolute, which is below the liquefying temperature of air at the pressure of the air after release, or in expansion tank 22$^c$. That pressure in said tank would be 51 atmospheres, and the absolute temperature of liquefaction for that pressure is the critical temperature, which is 133° centigrade, absolute. Therefore the final temperature in this 3rd step would be limited to 133° C. absolute. And the initial temperature in the next step would be the same.

4th step—

$$\frac{51-4}{4}\left(\frac{289}{133}\right)^2 = \text{a fall of 59 degrees C.}$$

The final temperature after final release to atmospheric pressure in this 4th step would fall in accordance with the Joule-Thomson equation, to 74° C. absolute; but here again, this temperature is below the temperature of liquefaction for air at atmospheric pressure, which is 81.6° C. absolute, therefore the final temperature could not fall below that point, but would be held at 81.6° C. absolute, which is —191.4° centigrade.

Thus it will be seen that in accordance with the formula announced by Dr. Joule and Sir William Thomson, after a long series of painstaking experiments (and for over 50 years recognized by all high authorities, so far as I am aware without a single exception) the best results that can be obtained with one releasing valve or throttled nozzle, and by expanding the air through such one valve or nozzle in one drop, from a compression of 201 atmospheres to one atmosphere, and from an initial temperature of —55° C., is a total fall in temperature of 87.873 degrees centigrade; and that the final temperature then is nearly 50 degrees above the liquefying point of the expanded air, for at atmospheric pressure a temperature of —191.4° C. is required to liquefy air. In order to liquefy air, in availing of the "Joule-Thomson effect" with one releasing valve or throttled nozzle, and one drop from 201 atmospheres to one atmosphere the initial temperature (before release) would have to be lowered from —55° C. to nearly —80° C. For instance, $$\frac{201-1}{4}\left(\frac{289}{193}\right)^2 = \text{fall of 112½ degrees centigrade.}$$

This gives 80+112½= a final temperature of —192.5° C., which is but about one degree below the liquefying temperature of the released air. Such a narrow margin would produce little or not liquefied air, so that in order to obtain even measurable results an initial temperature far below even —80° C. must be maintained. With my improved apparatus, however, and by releasing and expanding the highly compressed air in 4 steps of say 50 atmospheres at a time, through pressure-reducing valves 21, 21$^a$, 21$^c$ and 21$^x$, and into the expansion drums 22, 22$^a$ and 22$^c$ and the final expansion chamber 23, a liquefying temperature of the air is reached, as I have shown, in the 3rd step, in expansion drum 22$^c$, when the expanding air is still at 51 atmospheres (735 lbs. gage pressure); and in the last or 4th step, the temperature is below the liquefying point all the time during expansion in the chamber 23—and this result is obtained by releasing the air from an initial temperature of —55° C. only instead of —80° C. (which would be required in the one-drop system to even just reach the temperature of liquefaction). In practice with the one-drop release, in order to attain an 8% liquefaction of the air, an initial temperature of near to the point of liquefaction (—191.4° C.) is necessary.

Figure 6:
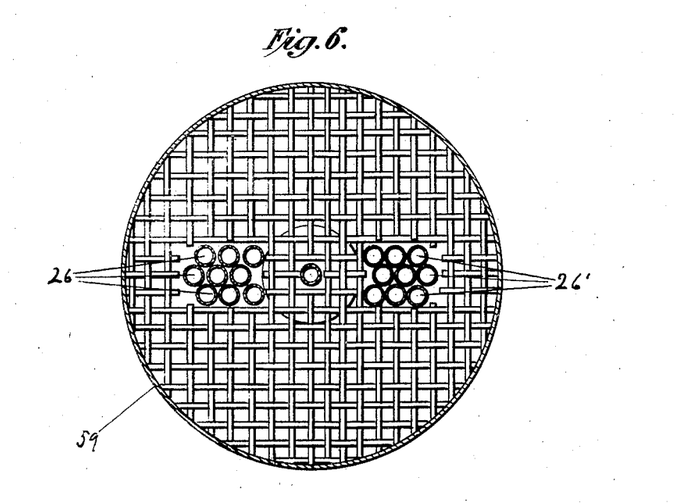
Fig. 6 is a plan view looking upon same coils.

At 34 (in Fig. 4) I have a header, shown more clearly in Fig. 9, to which is connected all of the tubes forming the liquefying helical coils 26 and 26′. As the air becomes liquefied in these coils, by the cold expanded air from chamber 23 and conduit 24, it drips by gravity into this header (34). From this header (34) I have the copper tube 50, which is formed into the coil 50', which during the operation of the apparatus, is submerged in liquefied gas in the downwardly projecting end 51, of the liquefier casing 25. This projecting end serves as a holder or reservoir for the air and other gases liquefied. The coil 50' has a syphon delivery tube 52, which delivers to the strainer head 53 through the valve 54. As the liquefied air accumulates in the submerged coil 50', by opening the valve 54, the liquefied air is forced up through the siphon tube 52, and is delivered in spray to the top of the first of the liquefying coils (26 and 26'), and gradually drips by gravity down around or between said coils into the reservoir 51. Here the liquefied air in the coil 50' is sub-cooled by the liquefied gas at atmospheric pressure in the reservoir 51,—causing said liquefied gas to evaporate, and as the liquid air is released from tension by the valve 54, being sub-cooled, vaporization of the same is prevented as delivered from the spray-head 53. At 55 I have an ordinary angle valve attached to and connected with the submerged coil 50', near its lower end, whereby by opening said valve the liquid air may be released from said coil (50') and delivered to the holder or reservoir 51, being thereby released to atmospheric pressure. At 56 I have a draw-off valve, by which the liquid gas in the reservoir (51) may be drawn off through the outlet tube 57, as desired; and at 58 I have a hollow drum around which to wind the coils 26 and 26'; and at 59 a wire-mesh disk to support said hollow drum, and to aid in scattering the flow of the expanded air from conduit 24 to all parts of the drum 25 and helical passage 27. This disk is shown more clearly in Fig. 6.

By closing valve 55 and partially opening valve 54, the liquefied air leaves the spray-head 53, and drips by gravity down around the coils 26 and 26' and comes in contact with the flow of ascending expanded air from the conduit 24, as it passes up through the helical passage 27, this liquid as it settles in the reservoir 51 will be found richer in oxygen than before release from tension by the valve 54, and it can be drawn off as such through valve 56; whereas, if valve 54 is kept closed, and all the liquefied air accumulating in reservoir 51, is supplied thereto through valve 55, the liquefied gas then drawn off through outlet valve 56 will be found to be very nearly of the same proportionate constituents as atmospheric air—except for total lack of both gaseous moisture and $CO_2$ gas.

In Fig. 2, at 60, I show a receptacle projecting downwardly from the casing 61, which incloses the several expansion tanks 22, 22$^a$ and 22$^c$, for the purpose of catching any liquefied air which may be produced as the air is delivered and expanded from the last pressure-reducing valve (21$^x$) to the chamber 23. This receptacle (60) has a drain pipe 62, having a valve 63, through which the liquefied air may be drawn from the apparatus. I have another connection, pipe 64, which has a valve 65, which pipe delivers to the strainer head 53 in the liquefying drum 25 (see Fig. 4). And in the expanded air conduit 24, I have a butterfly valve 66, and a similar valve (67) in the conduit 29'; (see Fig. 2), leading from the casing 61. By closing these two butterfly valves (66 and 67), and opening valve 65 (with valve 63 also closed, a slight pressure may be quickly generated in the casing 61, sufficient to force any liquefied air accumulating in the receptacle 60, up through the small pipe 64, into the strainer head 53 (see Fig. 4), where it will drip down into the reservoir 51, and mix with the liquefied air therein delivered from the upright pipe 52 and valve 54. At 68, 69, 70 and 71 (see Fig. 2) I show thermometers, and at 72, 73 and 74, pressure gages, to indicate the temperature and pressure in the several expansion tanks.

In Fig. 1 at 15' I show a continuation or branch of the high pressure air feed pipe 9, connected with the delivery pipe 15 from the caustic potash drum 6; and also at 75 and 76 valves. By closing valve 75 and opening valve 76, the chemical drums 5 and 6 can be cut out of the circuit, which is desirable after the air has run through the drums for awhile, and has become thoroughly free of both moisture and carbon dioxid gas. In starting up, however, valve 76 is closed and valve 75 is opened, when the highly compressed air delivered from the compressor 1, and through pipe 9, is forced through the chemical drums 5 and 6, to pipe 15 (see Figs. 1 and 7).

All of the cold parts, drums, conduits, pipes, &c., of the apparatus, especially the drums and casings shown in Figs. 1, 4, 7 and 8, are thoroughly insulated with eider down, wool, felt or other materials of low heat-conductivity, similar to the parts shown in Figs. 2 and 3.

Having thus described my invention, what I claim as new and original and desire to secure by Letters Patent, is—

1. In an apparatus for liquefying atmospheric air, a plurality of expansion chambers, arranged so that into each of which is delivered from a pressure-reducing valve, consecutively, air of an initial high compression, but let down in pressure, and expanded and cooled in steps, from chamber to chamber, successively, until substantially atmospheric pressure and the temperature of liquefaction of said repeatedly expanded air is reached in the last of said chambers; in operative combination with a holder, or low-pressure liquefied-gas reservoir, connected with and below said last expansion chamber; and a liquefier, having a high pressure holder, or liquefied-gas reservoir, below the same and connected therewith; and a delivery spray-head located above said high-pressure reservoir, and connected therewith through an upright pipe having a pressure-releasing liquefied-air valve; a low pressure conduit leading from the upper part of said last expansion chamber, and delivering to the outer surfaces of said liquefier; and a pipe connecting said low-pressure reservoir below said last expansion chamber, with said liquefied gas delivery spray-head.

2. In an apparatus for liquefying atmospheric air, a plurality of pressure-reducing throttled air valves, connected together and located, consecutively, one after the other, and each provided with and delivering to an air-expansion drum; in operative combination with means for supplying the first of said throttled pressure-reducing valves with air compressed to a tension greater than its critical pressure; an air-liquefying pipe coil, with means for supplying the same with air compressed to a less tension than that supplied to the first of said pressure-reducing valves; a conduit connected with one of said expansion drums, and delivering to the outer surfaces of said coil liquefier; and two liquefied-gas receptacles—one a low-pressure receptacle, located below the last pressure-reducing valve and its expansion drum and connected therewith, and the other a high-pressure receptacle, located below the said coil liquefier, and connected therewith.

3. In an apparatus for liquefying atmospheric air, a plurality of pressure-reducing throttled air valves, connected together consecutively or one after the other, and each provided successively with an expansion chamber, arranged so as to receive compressed air of a reduced pressure after passing through each successive valve; in operative combination with means for supplying the first of said pressure-reducing valves with air compressed to a greater tension than its critical pressure, and also means for compressing other air to a less tension; an air-liquefying pipe coil, charged with said compressed air of less tension, the lower coils of which form a high-pressure reservoir for the air liquefied under compression therein; a casing inclosing all of said air liquefying coil, the lower end of which forms a low-pressure liquefied gas reservoir, in which in the low-pressure liquefid gas therein is submerged the lower coils of said air-liquefying coil; a low-pressure unliquefied-air-carrying conduit, connecting the upper part of the last one of said expansion chambers with said casing, at a point just above the liquefied gas in said low-pressure reservoir at the bottom of said casing; and two liquefied gas-releasing valves, both connected with the lower coils, or submerged part, of said air-liquefying coil, and both releasing and delivering the liquefied air in said submerged coils to the said low-pressure reservoir at the bottom of said casing—one directly into said low-pressure reservoir, near the bottom thereof, and the other delivering to said casing above said air-liquefying coil.

Signed at New York city in the county of New York and State of New York this first day of February A. D. 1916.

JAMES F. PLACE.

Witnesses:
   J. G. GADSDEN,
   CLARENCE PLACE.